United States Patent
Lewis et al.

(10) Patent No.: US 6,241,613 B1
(45) Date of Patent: *Jun. 5, 2001

(54) DRIVE ARRANGEMENT

(75) Inventors: Graham Rhys Lewis; George Nicholas Felton; Richard Michael Turner, all of Gillingham (GB)

(73) Assignee: Lucas Industries Public Limited Company, Solihull (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,335

(22) Filed: Jan. 13, 1998

(30) Foreign Application Priority Data

Jan. 22, 1997 (GB) .................................................. 9701263

(51) Int. Cl.⁷ ........................................................ F16D 7/04
(52) U.S. Cl. ............................................ 464/37; 192/56.1
(58) Field of Search ............................... 192/56.1, 56.2; 464/30, 37, 77, 78

(56) References Cited

U.S. PATENT DOCUMENTS

| | | | |
|---|---|---|---|
| 852,045 | * 4/1907 | Vivinus | 192/56.1 |
| 1,997,021 | * 4/1935 | Spase | 464/77 |
| 2,541,947 | * 2/1951 | Starkey | 192/56.2 |
| 4,184,576 | 1/1980 | Kulischenko et al. | |
| 4,796,580 | 1/1989 | Wakeman . | |

FOREIGN PATENT DOCUMENTS

| | | |
|---|---|---|
| 1575735 | 1/1970 | (DE) . |
| 36 41 769 | 12/1986 | (DE) . |
| 43 41 424 | 6/1995 | (DE) . |
| 1050262 | 12/1966 | (GB) . |
| 2245546 | 1/1992 | (GB) . |
| 58-142028 | 8/1983 | (JP) . |
| 08159028 | 6/1996 | (JP) . |

* cited by examiner

Primary Examiner—Lynne H. Browne
Assistant Examiner—Greg Binda
(74) Attorney, Agent, or Firm—Andrus, Sceales, Starke & Sawall, LLP

(57) ABSTRACT

A drive arrangement for driving a rotary component of a fuel pump comprises a resilient member associated with either a drive shaft or the rotary component and engageable with a surface associated with the other of the drive shaft and rotary component. In use, where a braking force greater than a predetermined level is applied to the rotary component, the member rides out of engagement with the surface permitting relative rotary motion of the drive shaft and rotary component.

8 Claims, 2 Drawing Sheets

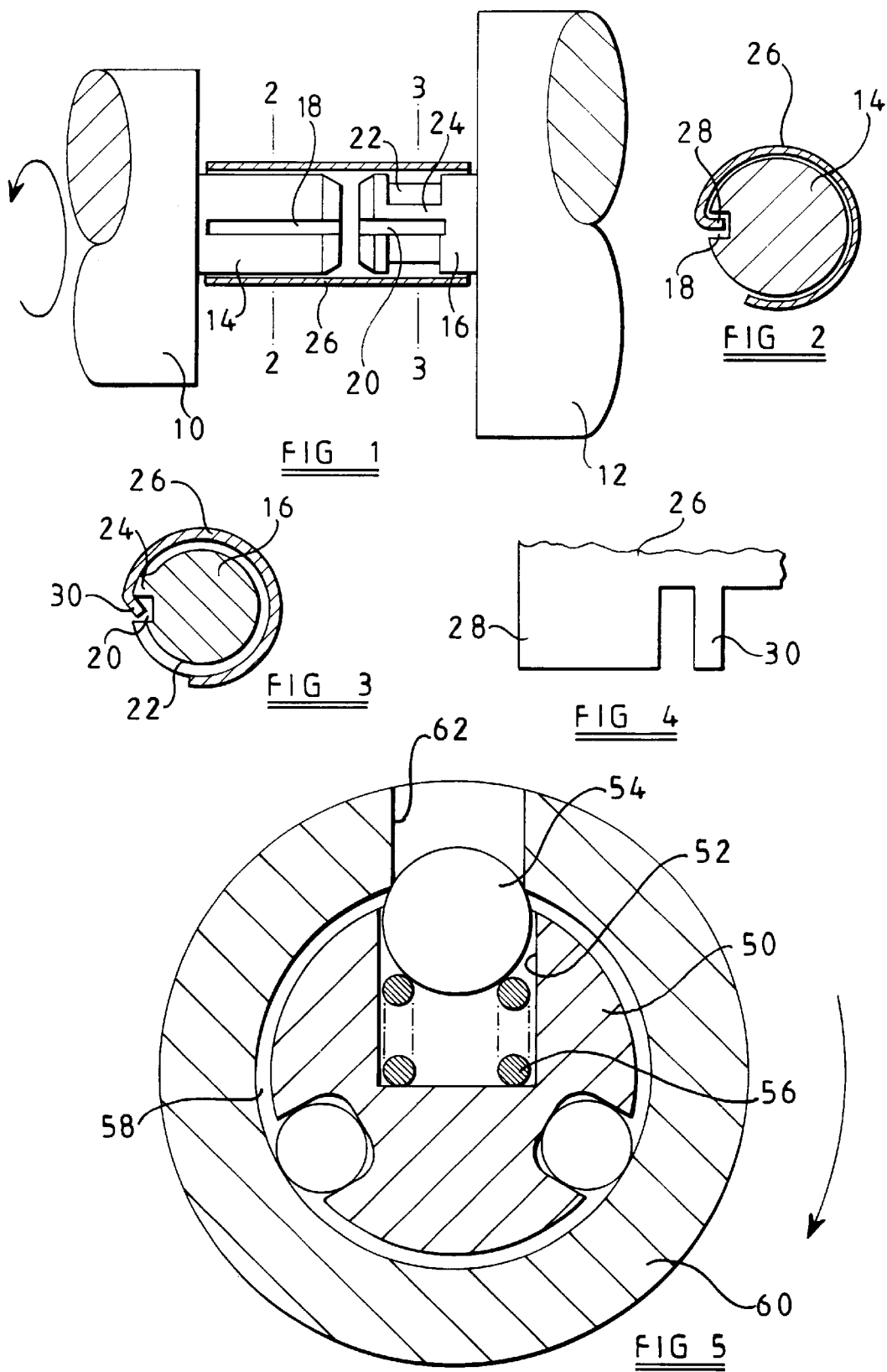

DRIVE ARRANGEMENT

This invention relates to a drive arrangement for use in transmitting rotary motion of a drive shaft to the rotary part of a fuel pump.

A known type of high pressure fuel pump for use in supplying fuel to the cylinders of a compression ignition engine comprises a rotary distributor member which is rotatable within a sleeve. The distributor member includes a plurality of passages which, in use, register with ports provided in the sleeve whereby fuel is supplied at relatively low pressure to a pumping chamber, and whereby fuel from the pumping chamber is supplied, at high pressure, to the cylinders of the engine. In order to minimize leakage between the distributor member and the sleeve, the clearance between the distributor member and the sleeve is extremely small. The provision of such a small clearance increases the risk of seizure of the pump, in use, for example as a result of thermal expansion.

The distributor member is coupled to a drive shaft which drives the distributor member at a speed associated with engine speed. As the distributor member is coupled to the drive shaft, seizure of the pump results in rotation of the drive shaft terminating and may result in the drive shaft or other parts of the engine being damaged, or in the engine and fuel system requiring adjustment in order to adjust the timing of fuel delivery. In order to avoid such damage, it is known to provide an annular recess in the distributor member thus forming a relatively weak region. Upon seizure of the pump, the distributor member fractures at the weak region, thus permitting continued rotation of the drive shaft.

Clearly, such an arrangement then requires replacement of the distributor member.

According to the present invention there is provided a drive arrangement for transmitting rotary motion of a drive shaft to the rotary component of a pump, the drive arrangement comprising a resilient member carried by one of the drive shaft and the rotary component, the resilient member being engageable with a surface associated with the other of the drive shaft and the rotary component to transmit rotary motion of the drive shaft to the rotary component, the resilient member being arranged to ride out of engagement with the surface upon the application of a braking force greater than a predetermined braking force to the rotary component to permit relative rotary motion of the drive shaft and the rotary component.

The surface may be defined, in part, by a surface of a second projection carried by the said other of the drive shaft and the rotary component, the member being arranged to ride out of engagement with the second projection upon the application of a braking force greater than the predetermined braking force.

The drive arrangement may include a resilient, split tubular component arranged to extend around part of the periphery of the drive shaft and part of the rotary component, the tubular component being carried by and keyed to one of the rotary component and the drive shaft, the member being defined by a resilient first projection forming an integral part of the tubular component, the first projection extending inwardly and being arranged to engage the second projection provided on the other of the rotary component and the drive shaft which defines the said surface.

The tubular component may include a further projection of axial length greater than that of the resilient projection whereby the tubular component is keyed to the said one of the drive shaft and the rotary component. In use, the shorter axial length of the resilient projection results in the resilient projection riding over the second projection, upon seizure of the pump.

The part of the said other of the rotary component and the drive shaft around which the tubular component extends is conveniently shaped so that once the resilient projection has ridden out of engagement with the second projection, relative rotation of the drive shaft and rotary component is substantially unimpeded, the relative rotation subsequently resulting in the resilient projection returning into engagement with the second projection.

In an alternative embodiment, the resilient member takes the form of a member slidable within a radially extending bore, the member being spring biased out of the bore and being engageable with the said surface which is conveniently defined by a second projection. The bore is conveniently provided in the drive shaft, the part of the drive shaft provided with the bore being received within a recess provided in an end of the rotary component. The member is conveniently biased towards a position in which, when the member has ridden over the second projection, the member does not engage the rotary component.

In a further alternative, the resilient member may comprise a spherical member spring biased out of a bore, the surface being defined by a bore of diameter smaller than that of the spherical member within which part of the spherical member is receivable.

The invention will further be described, by way of example, with reference to the accompanying drawings, in which:

FIG. 1 is a diagrammatic view of a drive arrangement in accordance with an embodiment of the invention, in use;

FIG 2 is a sectional view along the line 2—2 of FIG. 1;

FIG. 3 is a sectional view along the line 3—3 of FIG. 1;

FIG. 4 is a scrap view of part of the drive arrangement;

FIG. 5 is a diagrammatic sectional view of a drive arrangement in accordance with a second embodiment.

Figure 6:
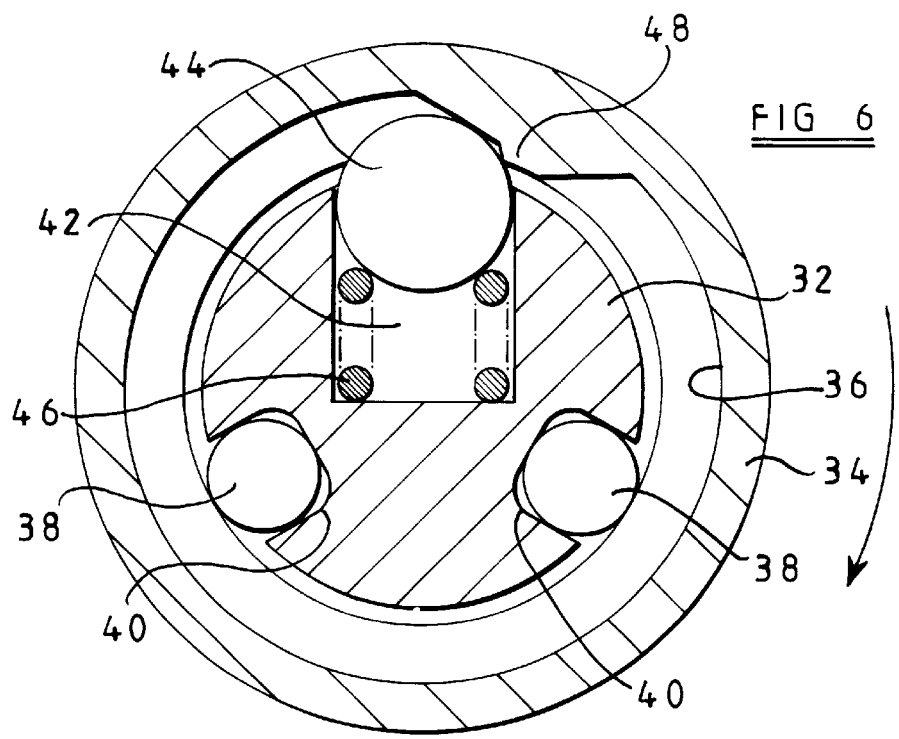
FIGS. 6 and 7 are diagrammatic sectional views of a drive arrangement an in accordance with a third embodiment.

The drive arrangement illustrated in FIGS. 1 to 4 is intended for use in transmitting rotary motion from a drive shaft 10 to the rotary component 12 of a fuel pump. The drive shaft 10 includes an axially extending projection or stub 14 which is of reduced diameter. The rotary A component 12 also includes an axially extending projection or stub 16 which is of diameter substantially equal to the diameter of the stub 14.

The stubs 14, 16 are both provided with elongate slots 18, 20 which extend in a direction parallel to the axes of the stubs 14, 16. In addition to the slot 20, the stub 16 is provided with a part annular recess or groove 22, the recess or groove 22 being located at a position spaced from the end of the stub 16. The groove 22 is slightly shallower in depth than the slot 20, and as shown in FIGS. 1 and 3, the slot 20 and groove 22 together define a tooth or projection 24.

A part tubular, resilient coupling component 26 extends around part of the periphery of the stub 14 and part of the periphery of the stub 16. An edge of the coupling component 26 is turned inwardly to define a lip, and as shown in FIG. 4, the lip is divided so as to define a first inwardly extending part 28 of relatively large axial length intended to be received within the slot 18 of the stub 14, and a second part of relatively short axial length intended to be received within the slot 20 of the stub 16 and defining a resilient projection 30.

In use, the first part 28 is received within the slot 18 of the stub 14, and the projection 30 is received within the slot 20 of the stub 16. In this position, rotary motion of the drive shaft 10 is transmitted by the coupling component 26 to the rotary component 12 of the pump, the provision of the first part 28 received within the slot 18 acting as a key arrangement thus driving the coupling component 26 to rotate with the drive shaft 10 whilst the resilient projection 30 which is located within the slot 20 engaging a surface of the tooth 24 keys the coupling component 26 to the stub 16 thus driving the rotary component 12.

If, in use, the rotary component 12 becomes seized, for example due to an increase in the temperature of the distributor member of the pump resulting in thermal expansion, a braking force is applied to the rotary component 12 due to the engagement between the distributor member and the sleeve within which the distributor member rotates. The continued rotation of the drive shaft 10 whilst the braking force is applied to the rotary component results in the coupling component 26 experiencing a force tending to deform the coupling component 26 to permit the resilient projection 30 to leave the slot 20, riding out of engagement with the surface of the tooth 24.

The removal of the projection 30 from the slot 20 permits relative rotation of the drive shaft 10 and rotary component 12, rotation of the coupling component 26 no longer resulting in rotation of the rotary component 12. The seizure of the rotary component 12 does not therefore result in damage to other parts of the engine. Continued rotation of the drive shaft 10 results in the coupling component 26 rotating, thus the projection 30 rides through the groove 22 until a complete rotation of the drive shaft 10 has taken place. In this position, the projection 30 is once more located within the slot 20 engaging the surface of the tooth 24. If the braking force is no longer applied to the rotary component 12, continued rotation of the drive shaft 10 once more results in rotation of the rotary component 12. However, if the braking force is still applied to the rotary component 12, the projection 30 once more rides over the tooth 24 and through the groove 22 as described herein before.

It will be appreciated that as the axial length of the first part 28 is significantly greater than that of the projection 30, upon the application of a braking force to the rotary component 12, it is the projection 30 of the coupling component which flexes and moves out of its slot 20, the first part 28 remaining within the slot 18.

As, once the projection 30 is removed from the slot 20, relative rotation of the coupling component 26 and rotary component 12 is substantially unrestricted, it will be appreciated that rotation of the coupling component 26 does not result in rotation of the rotary component 12 until the projection 30 is once more received within the slot 20. Clearly, therefore, drive of the rotary component 12 does not recommence until the rotary component 12 is correctly positioned with respect to the drive shaft 10.

In the arrangement illustrated in FIG. 5, the drive shaft 50 is provided with a radially extending bore 52. A spherical member 54 is slidable within the bore 52, the bore 52 being of diameter slightly greater than that of the spherical member 54. A spring 56 biases the spherical member 54 out of the bore 52. The part of the drive shaft 50 within which the bore 52 is provided is located within a recess 58 provided in an end of the rotary component 60. The rotary component 60 is provided with a second bore 62 of diameter smaller than that of the spherical member 54, the second bore 62 defining a recess arranged to receive part of the spherical member 54.

In use, in the position illustrated in FIG. 5, rotary motion of the drive shaft 50 is transmitted to the rotary component 60 through the spherical member 54. If a sufficiently large braking force is applied to the rotary component 60, the spherical member 54 rides out of the second bore 62 against the action of the spring 56, thus rotary motion is no longer transmitted to the rotary component 60.

After a complete revolution of the drive shaft 50 with respect to the rotary component 60, the spherical member 54 is once more received by the second bore 62, thus if the braking force is no longer applied to the rotary component 60, drive is transmitted thereto through the spherical member 54. If the braking force is still being applied, the spherical member 54 rides out of the recess as described hereinbefore.

Figure 7:
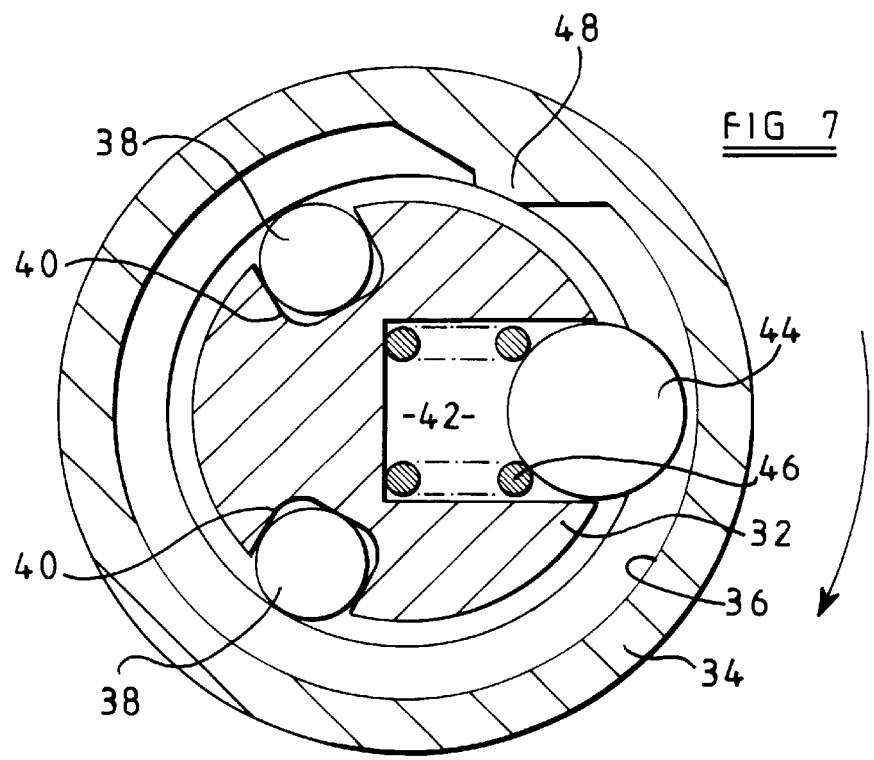

FIGS. 6 and 7 illustrate a further alternative embodiment in which an end part of a drive shaft 32 is received within a cylindrical, axially extending recess 36 provided in an end of a rotary component 34 of a pump, the rotary component 34 and drive shaft 32 being coaxial with one another. The open end of the recess 36 is of reduced diameter. A pair of rollers 38 are carried by the drive shaft 32, the rollers 38 being received within grooves 40 provided in the part of the drive shaft 32 located within the part of the recess 36 of reduced diameter. The rollers 38 are arranged such that their axes extend parallel to the axis of the drive shaft 32, the rollers 38 engaging the inner surface of the reduced diameter part of the recess 36 to ensure that the drive shaft 32 and rotary component 34 remain substantially coaxial, in use.

A radially extending bore 42 is provided in the part of the drive shaft 32 located within the part of the recess 36 of relatively large diameter. A spherical member 44 is located within the bore 42 and is biased out of the bore 42 by a helical spring 46.

An inwardly extending projection 48 is located within the large diameter part of the recess 36, the projection 48 being integral with the rotary component 34. The location of the projection 48 is such that the member 44 is engageable therewith, the engagement between the member 44 and the projection 48 and the location of the member 44 within the bore 42 provided in the drive shaft 32 transmitting rotary motion of the drive shaft 32 to the rotary component 34.

Should a braking force be applied to the rotary component 34 which exceeds a predetermined level, the member 44 will ride over the projection 48, the member being pushed into the bore 42 against the action of the spring 46. Once the member 44 has ridden over the projection 48 (see FIG. 7), the drive shaft 32 is free to rotate with respect to the rotary component 34 without transmitting a drive force thereto until a complete revolution of the drive shaft 32 with respect to the rotary component 34 has occurred. In this position, the member 44 once more engages the projection 48 as shown in FIG. 6. If the braking force is still being experienced by the rotary component 34, the member 44 rides over the projection 48 as described hereinbefore.

When the braking force is removed, upon the member 44 returning into engagement with the projection 48, the rotary motion of the drive shaft 32 is transmitted to the rotary component 34. As the engagement between the member 44 and the projection 48 only occurs in one relative angular orientation of the drive shaft 32 and rotary component 34, the timing of the pump with respect to engine position is correct.

As shown in FIG. 7, the free length of the spring 46 is selected such that when the member 44 has ridden over the projection 48, the spring 46 biases the member 44 towards a position in which the member 44 does not engage the rotary component 34, thus the member 44 does not impede relative rotary motion of the drive shaft 32 and rotary component 34.

In addition to providing drive arrangements which are designed to limit damage as a result of seizure of the rotary component of a pump, the drive arrangements are of relatively simple form and are relatively easy to assemble, and in addition permit a small degree of misalignment thus an additional arrangement which is designed to allow for a small degree of misalignment, for example an oldham coupling, is not required.

What is claimed is:

1. A drive arrangement for transmitting rotary motion of a drive shaft to the rotary component of a pump, the drive arrangement comprising a first part associated with the drive shaft, a second part associated with the rotary component, a resilient member for engagement with a surface associated with one of the first part and the second part and a further member for engagement with a further surface associated with the other of the first part and the second part to transmit rotary motion of the drive shaft to the rotary component, whereby, in use, engagement between the resilient member and the surface occurs in only one relative angular orientation of the drive shaft and the rotary component, the resilient member being arranged to ride out of engagement with the surface, upon the application of a braking force greater than a predetermined braking force to the rotary component, whilst the further member remains in engagement with the further surface, thereby permitting relative rotary motion of the drive shaft and the rotary component.

2. A drive arrangement as claimed in claim 1, wherein when such relative rotary motion is permitted, such relative motion is permitted to continue until the resilient member returns into engagement with the surface.

3. A drive arrangement as claimed in claim 1, wherein the surface is defined, in part, by a surface of a first projection carried by the said one of the drive shaft and the rotary component, the resilient member being arranged to ride out of engagement with the first projection upon the application of a braking force greater than the predetermined braking force.

4. A drive arrangement as claimed in claim 3, further comprising a resilient, split tubular component arranged to extend around part of the periphery of the drive shaft and part of the rotary component, the tubular component being carried by and keyed to one of the rotary component and the drive shaft, the resilient member being defined by a resilient projection extending inwardly and being arranged to engage the first projection provided on the other of the rotary component and the drive shaft which defines the said surface.

5. A drive arrangement as claimed in claim 4, wherein the further member is defined by a further projection carried by the tubular component, the further projection having an axial length greater than that of the resilient projection whereby the tubular component is keyed to the said one of the drive shaft and the rotary component.

6. A drive arrangement as claimed in claim 5, wherein the part of the said other rotary component and the drive shaft around which the tubular component extends is shaped so that once the resilient projection has ridden out of engagement with the first projection, relative rotation of the drive shaft and rotary component is substantially unimpeded, the relative rotation subsequently resulting in the resilient projection returning into engagement with the first projection.

7. A drive arrangement for transmitting rotary motion of a drive shaft to the rotary component of a pump, the drive arrangement comprising a first part associated with the drive shaft, a second part associated with the rotary component, a resilient member for engagement with a surface associated with one of the first part and the second part and a further member for engagement with a further surface associated with the other of the first part and the second part to transmit rotary motion of the drive shaft to the rotary component, whereby, in use, engagement between the resilient member and the surface occurs in only one relative angular orientation of the drive shaft and the rotary component, the resilient member being arranged to ride out of engagement with the surface upon application of a braking force greater than a predetermined braking force to the rotary component thereby permitting relative rotary motion of the drive shaft and rotary component, wherein when such relative rotary motion is permitted, such relative motion is permitted to continue until the resilient member returns into engagement with the surface, wherein the surface is defined, in part, by a surface of a first pro. carried by the said one of the drive shaft and the rotary component, the resilient member being arranged to ride out of engagement with the first projection upon the application of a braking force greater than the predetermined braking force, the drive arrangement further comprising a resilient, split tubular component arranged to extend around part of the periphery of the drive shaft and part of the rotary component, the tubular component being carried by and keyed to one of the rotary component and the drive shaft, the resilient member being defined by a resilient projection forming an integral part of the tubular component, the resilient projection extending inwardly and being arranged to engage the first projection provided on the rotary component and the drive shaft which defines the said surface and wherein the further member is defined by a further projection carried by the tubular components, the further projection having an axial length greater than that of the resilient projection whereby the tubular component is keyed to the said one of the drive shaft and the rotary component.

8. A drive arrangement for transmitting rotary motion of a drive shaft to the rotary component of a pump, the drive arrangement comprising a first part associated with the drive shaft, a second part associated with the rotary component a resilient member for engagement with a surface associated with one of the first part and the second part and a further member for engagement with a further surface associated with the other of the first part and the second part to transmit rotary motion of the drive shaft to the rotary component, whereby, in use, engagement between the resilient member and the surface occurs in only one relative angular orientation of the drive shaft and the rotary component, thereby permitting relative rotary motion of the drive shaft and the rotary component, wherein when such relative rotary motion is permitted, such relative motion is permitted to continue until the resilient member returns into engagement with the surface, wherein the surface is defined, in part, by a surface of a first projection carried by the said one of the drive shaft and the rotary component, the resilient member being arranged to ride out of engagement with the first projection upon the application of a braking force greater than a predetermined braking force, the drive arrangement further comprising a resilient, split tubular component arranged to extend around part of the periphery of the drive shaft and part of the rotary component, the tubular component being carried by and keyed to one of the rotary component, and the drive shaft, the resilient member being defined by a resilient projection forming an integral part of the tubular component, the resilient projection extending inwardly and being arranged to engage the first projection wherein the further member is defined by a further projection carried by the tubular component, the further projection having an axial length greater than that of the resilient projection whereby the tubular component is keyed to the said one of the drive shaft and the rotary component, and wherein the part of the rotary component and the drive shaft around which the tubular component extends is shaped so that once the resilient projection has ridden out of engagement with the first projection, relative rotation of the drive shaft and rotary component is substantially unimpeded, the relative rotation subsequently resulting in the resilient projection returning into engagement with the first projection.

* * * * *

UNITED STATES PATENT AND TRADEMARK OFFICE
CERTIFICATE OF CORRECTION

PATENT NO. : 6,241,613 B1
DATED : June 5, 2001
INVENTOR(S) : Graham Rhys Lewis et al.

It is certified that error appears in the above-identified patent and that said Letters Patent is hereby corrected as shown below:

<u>Column 6, claim 7,</u>
Line 14, delete "pro." and substitute -- projection --.
Line 26, delete "provided on the";
Line 27, delete "rotary component and the drive shaft which defines the said"; and,
Line 28, delete "surface and".

Signed and Sealed this

Twenty-fifth Day of December, 2001

*Attest:*

JAMES E. ROGAN
*Attesting Officer*   *Director of the United States Patent and Trademark Office*